United States Patent [19]
Dentant et al.

[11] 3,797,503
[45] Mar. 19, 1974

[54] CLUSTER BREAKER
[75] Inventors: Willy G. A. Dentant, St. Niklaas; Gustaaf M. Persoons, Merksem, both of Belgium
[73] Assignee: International Machinery Corporation S.A., St. Niklaas-Waas, Belgium
[22] Filed: July 31, 1972
[21] Appl. No.: 276,868

[52] U.S. Cl.............................. 130/30 R, 130/30 B
[51] Int. Cl............................................. A01g 19/00
[58] Field of Search ....................... 130/30 R, 30 B

[56] References Cited
UNITED STATES PATENTS
3,119,395  1/1964  Carruthers ......................... 130/30 R
3,115,170  12/1963  Rodriguez et al................. 130/30 R
3,059,648  10/1962  Burton ............................. 130/30 R Primary Examiner—Antonio F. Guida
Attorney, Agent, or Firm—A. J. Moore; C. E. Tripp

[57] ABSTRACT

Pod type vegetables are deposited singly and in clusters on a cluster breaker composed of a plurality of layers of spaced guide tracks. Endless conveyors guided by the tracks in their associated layers have cluster engaging pins projecting upwardly therefrom and have certain adjacent runs in the same layers moving in opposite directions. Pairs of driven cutters straddle each conveyor run at its downstream end for cutting each cluster into pieces allowing the individual pieces to fall downwardly for collection and allowing partial clusters cut from a larger cluster in the upper layer to fall downwardly to straddle a conveyor run in the next lower level for further separation.

11 Claims, 12 Drawing Figures

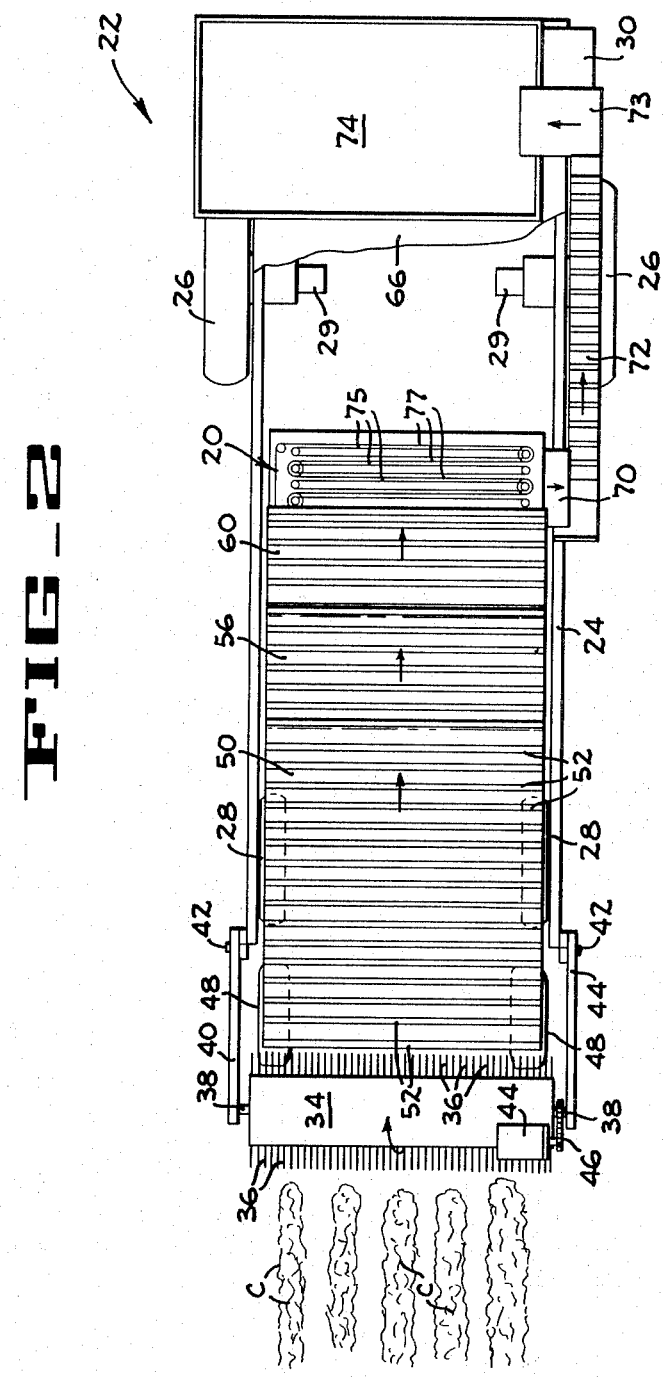

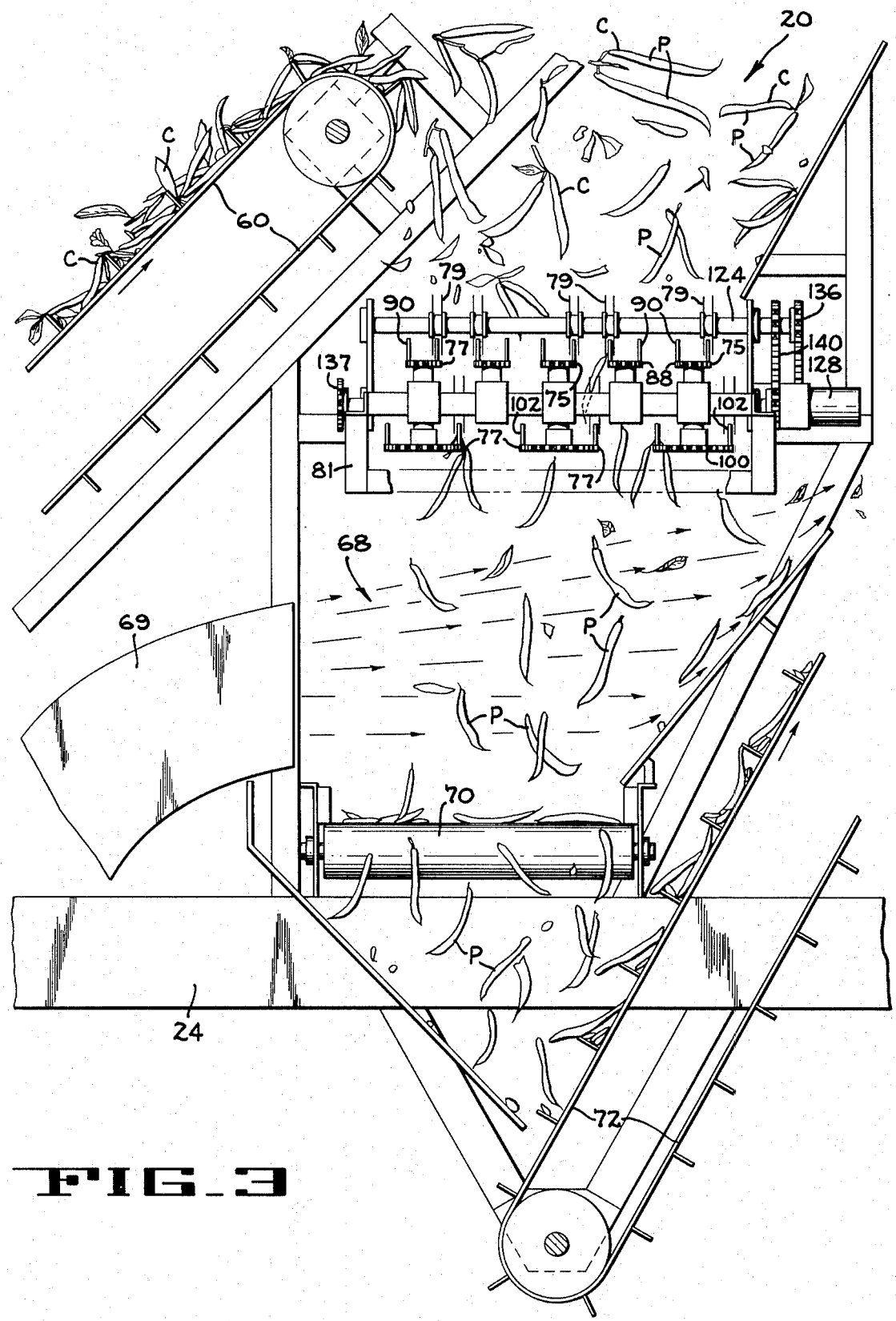
FIG_3

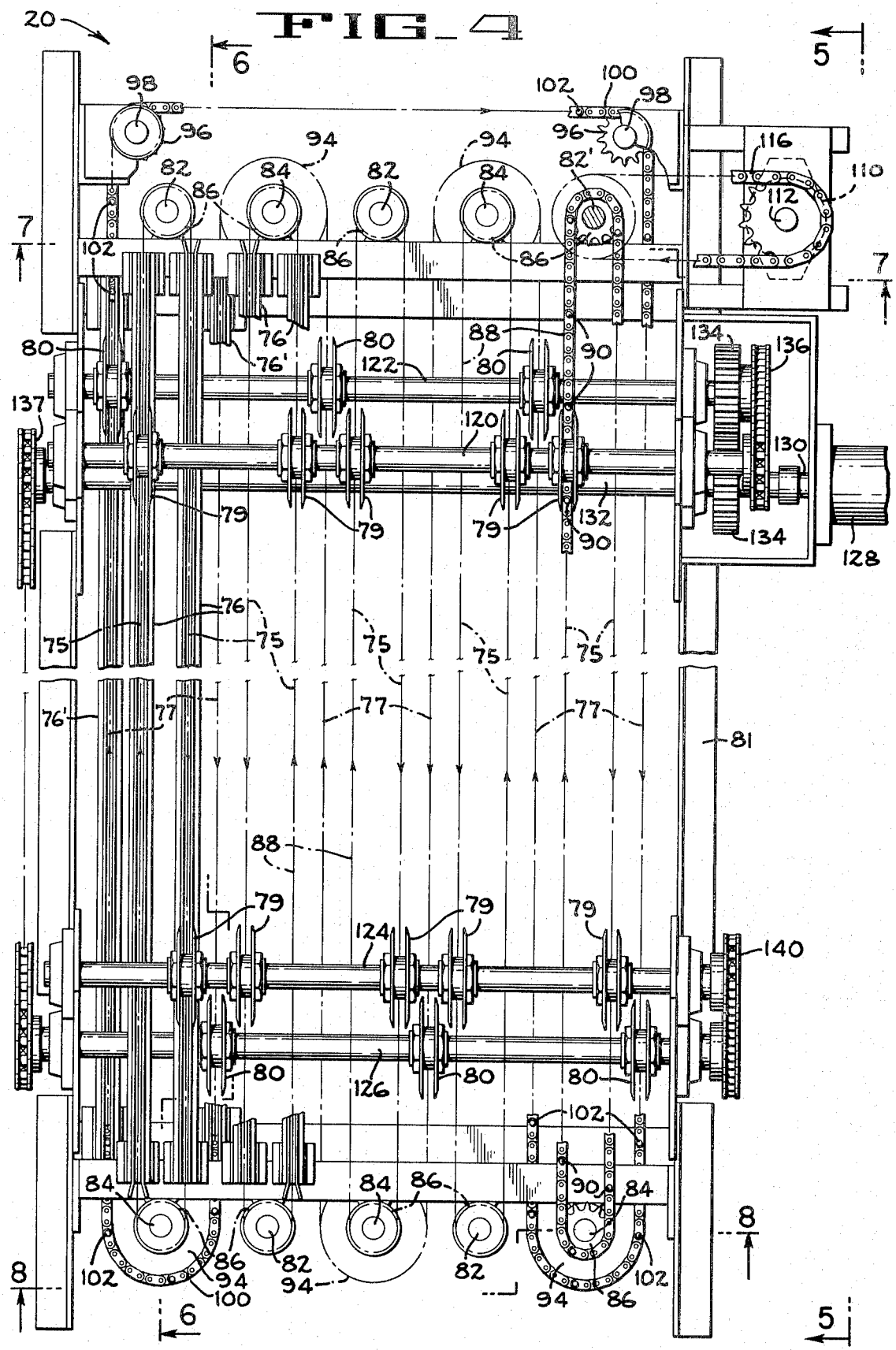

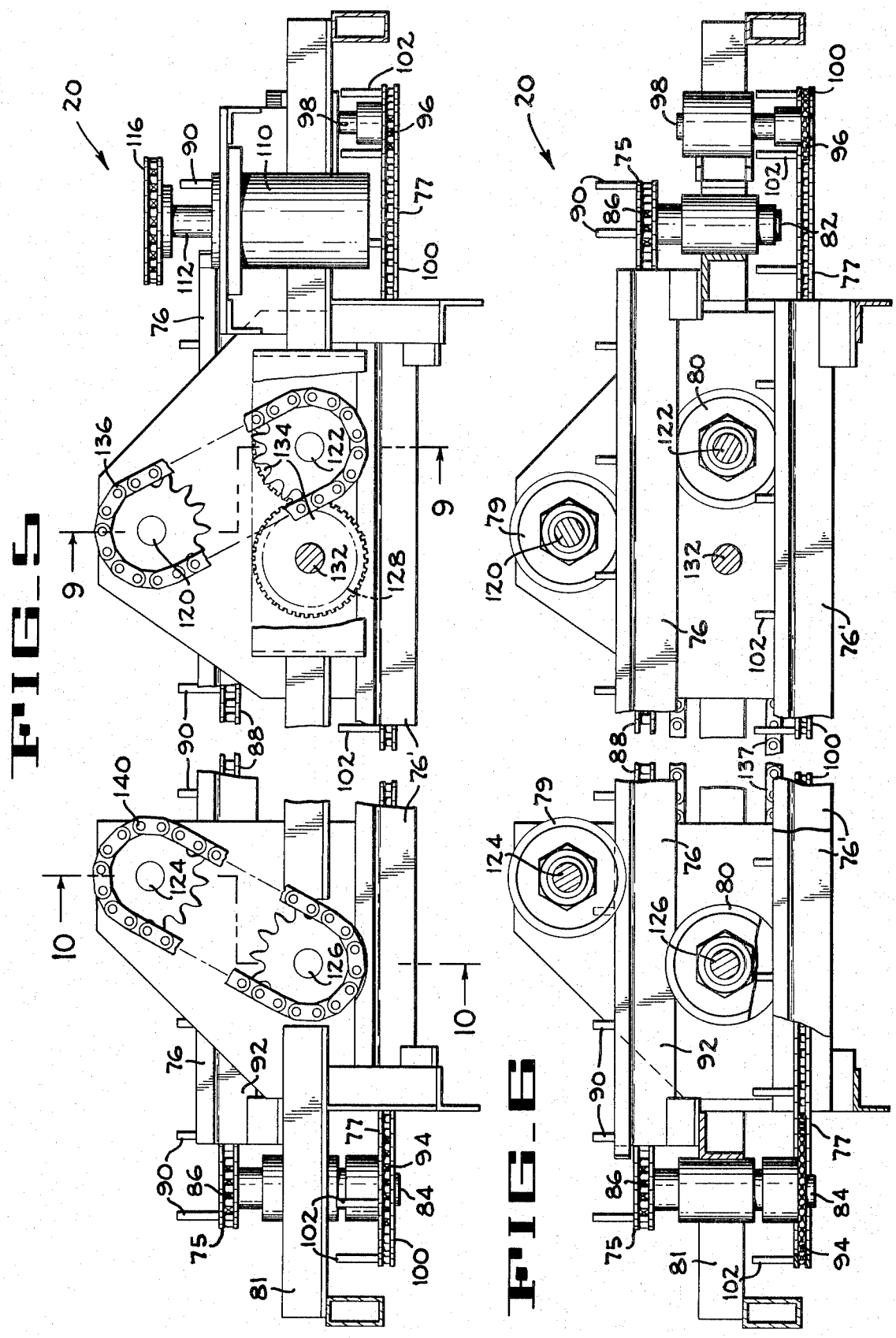

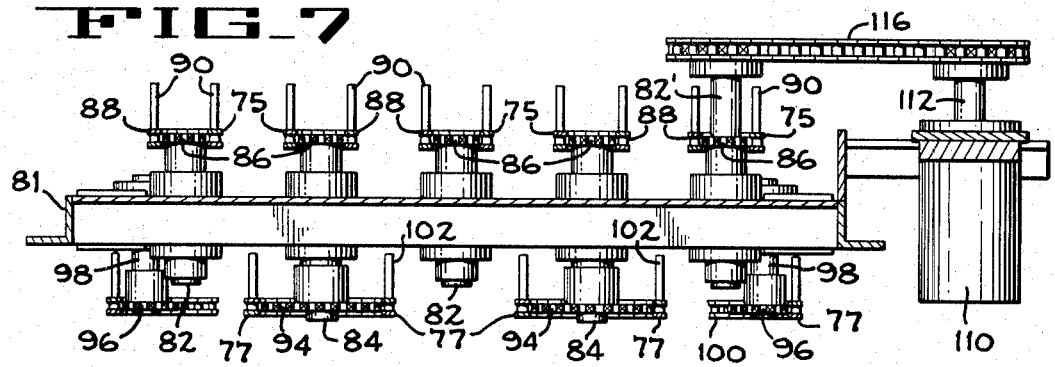
FIG_7
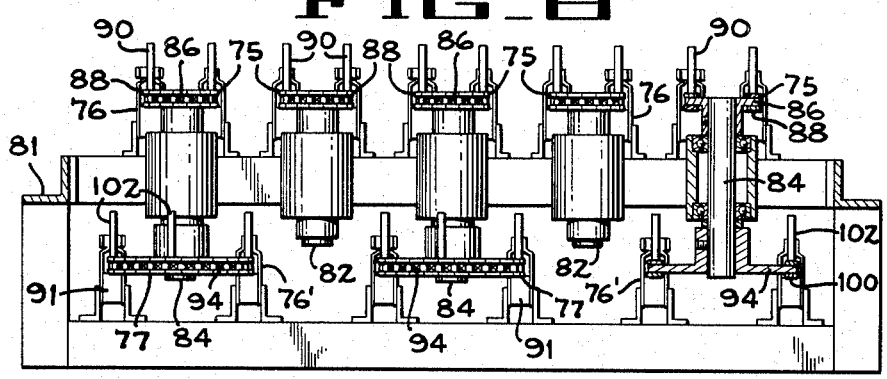
FIG_8
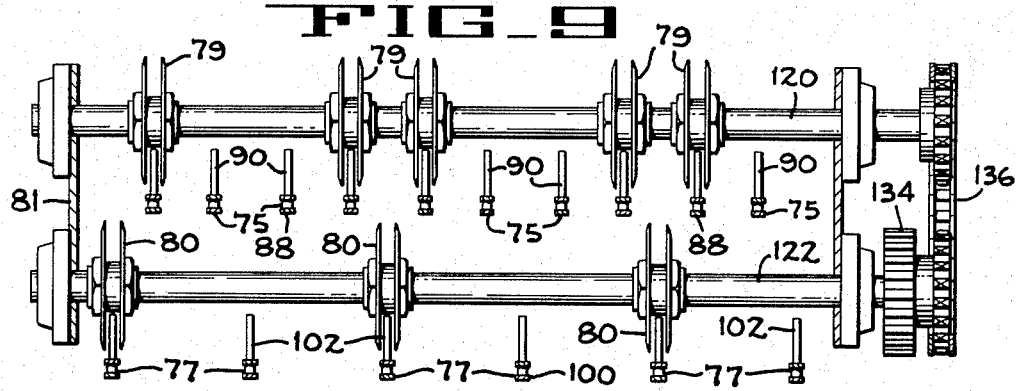
FIG_9
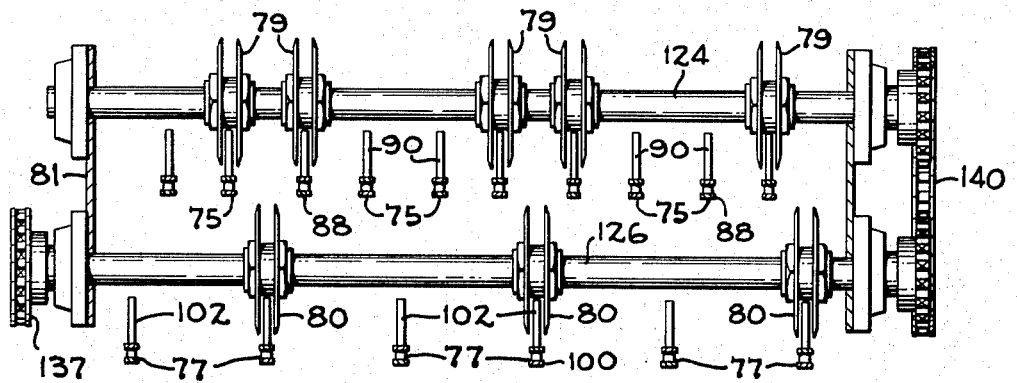
FIG_10

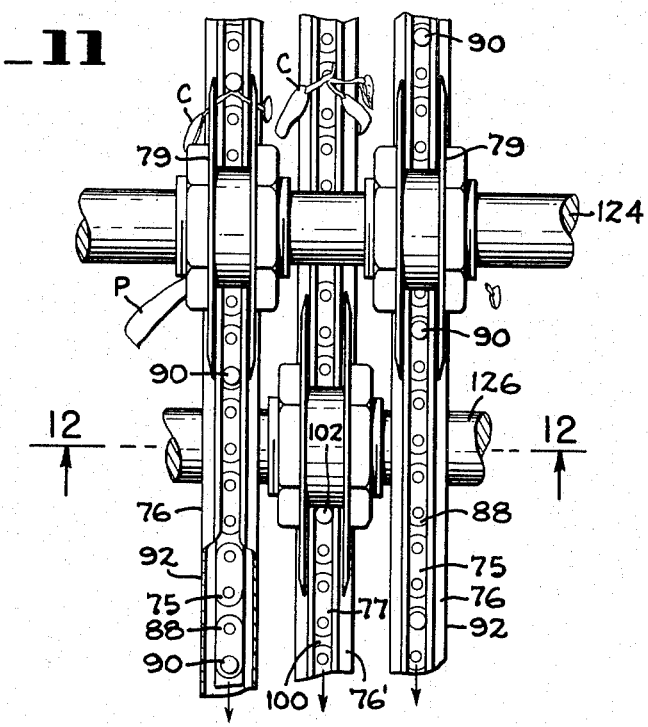
FIG_11
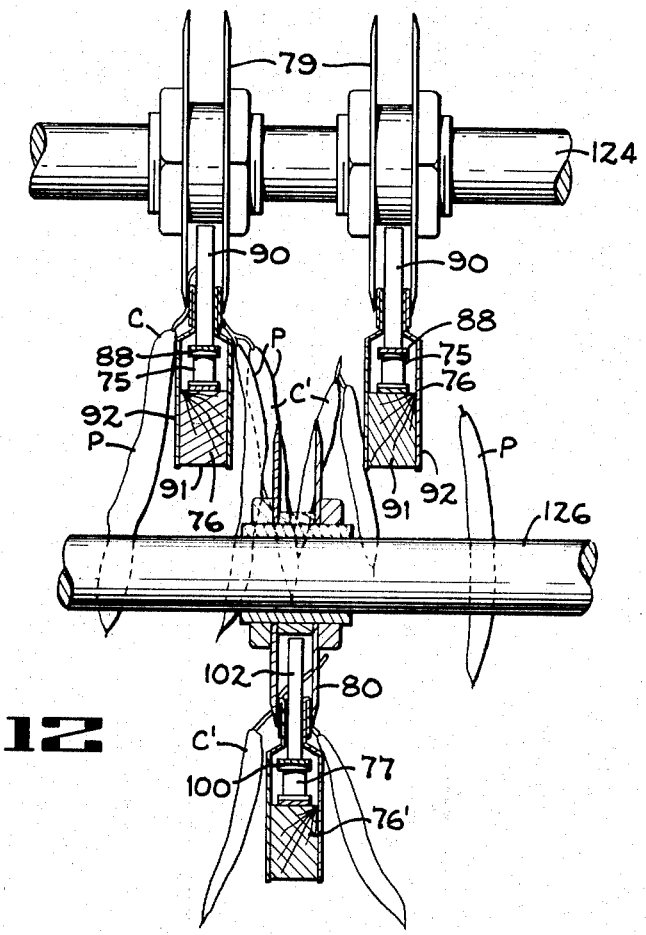
FIG_12

CLUSTER BREAKER

BACKGROUND OF THE INVENTION

1. Field of the Invention

This invention pertains to the article separating art and more particularly relates to a cluster breaker for freeing clusters of pod type vegetables or the like from their vines and for breaking the clusters into individual pods.

2. Description of the Prior Art

Cluster breakers are known in the art for breaking clusters of beans, peas, and cherries or the like into individual articles thus enabling the single articles to be more readily handled by subsequent processing equipment. For example, United States Pat. No. 2,763,114 discloses a harvester mounted pod separator in the form of a plurality of rotating notched discs which engage and move pod supporting stems or vines past a stationary cutter thereby severing the pods from the vines. United States Pat. No. 2,825,375 discloses a factory mounted cluster breaker for cherries which includes an endless conveyor belt which advances clusters of cherries past a staggered series of upwardly inclined pickup fingers. The cherry stems engage and ride up the fingers and are severed by a rotary saw associated with each finger. United States Pat. No. 3,059,648 discloses an open ended rotatable drum for repeatedly lifting and dropping clusters of string beans onto bars extending between horizontal endless conveyor flights which advance them into engagement with reciprocating cutters disposed at opposite ends of the drum.

SUMMARY OF THE INVENTION

The cluster breaker of the present invention is preferably mounted on a harvester and includes a plurality of endless chains trained around sprockets mounted for rotation about generally vertical axes. The endless chains are arranged to move along parallel generally horizontal paths by chain guides disposed in at least two levels, with half of the chains in each level moving in opposite directions to aid in separating the clusters and to prevent bunching. The clusters fall onto and straddle the runs of each conveyor with the stems engaging the chains guides and the pods hanging down therefrom. Each chain has a series of generally vertical cluster engaging drive pins which advance the clusters into engagement with a pair of driven rotary cutters associated with each conveyor run and disposed at the discharge end thereof thereby cutting the stems and allowing the individual pods and/or the partially severed clusters to gravitate downwardly. The partially severed clusters may fall onto conveyor runs in the next lower level and may again be severed by similar rotary cutters upon reaching the downstream end of these runs. The single pods which advance through the cluster breaker are collected on a take away conveyor or the like.

BRIEF DESCRIPTION OF THE DRAWINGS

FIG. 2 is a diagrammatic plan of the harvester of FIG. 1 with the upper housing components removed.

FIG. 3 is an enlarged end elevation of a portion of the harvester illustrating the cluster breaker and the manner in which the beans are fed into the cluster breaker.

FIG. 4 is an enlarged top plan of the cluster breaker.

FIG. 5 is a side elevation of the cluster breaker looking in the direction of arrows 5—5 of FIG. 4 with the central portion being broken away.

FIG. 6 is a vertical section taken along lines 6—6 of FIG. 4 with the central portion being broken away.

FIG. 7 is an enlarged vertical section taken along lines 7—7 of FIG. 4 illustrating the sprockets at one end of the cluster breaker for supporting the two levels of conveyor chains.

FIG. 8 is a section taken along lines 8—8 of FIG. 4 illustrating the sprockets and chain guides at the other end of the cluster breaker.

FIG. 9 is an enlarged vertical section taken along lines 9—9 of FIG. 5 illustrating the rotary cutters at one end of the cluster breaker.

FIG. 10 is an enlarged vertical section taken along lines 10—10 of FIG. 5 illustrating the rotary cutters at the other ends of the cluster breaker.

FIG. 11 is an enlarged operational view in plan illustrating the manner in which the conveyors and guides support clusters and advance the clusters toward their associated cutters.

FIG. 12 is a vertical section taken along lines 12—12 of FIG. 11 further illustrating the operation of the cluster breaker.

DESCRIPTION OF THE PREFERRED EMBODIMENT

Figure 1:
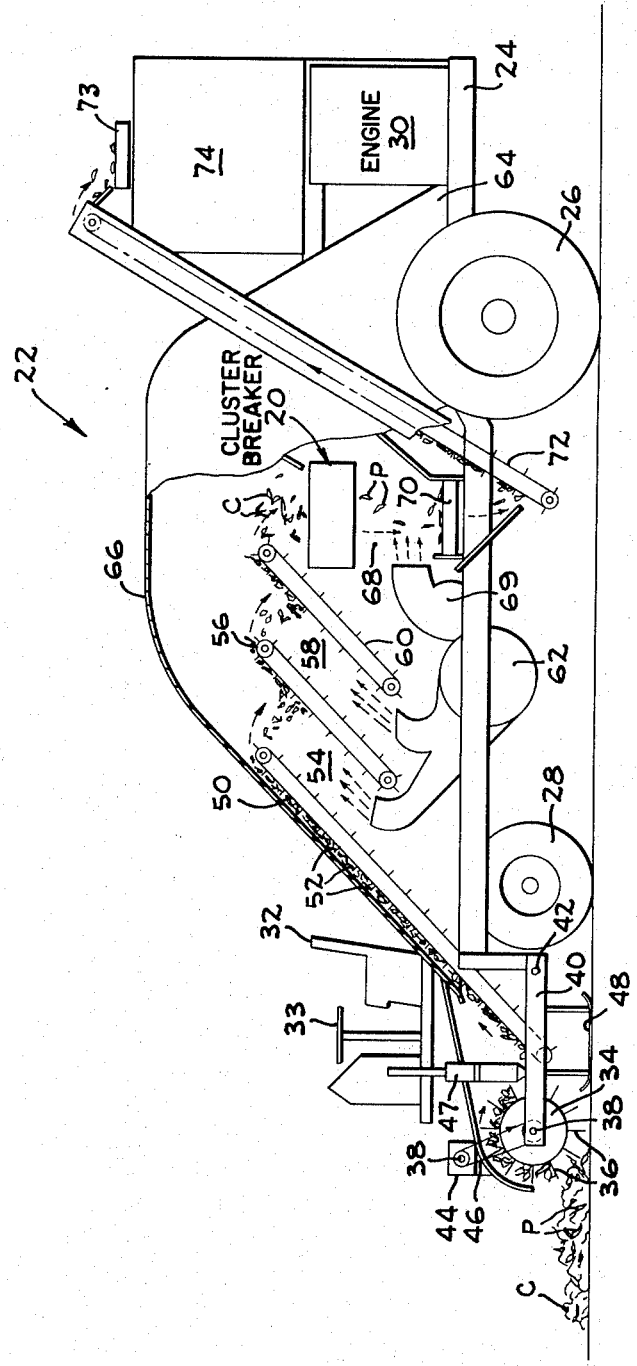
FIG. 1 is a diagrammatic elevation of a bean harvester with the cluster breaker of the present invention positioned therein.

The cluster breaker 20 (FIGS. 1 and 2) of the present invention is illustrated as a component of a bean harvester 22 although it will be understood that the cluster breaker may be mounted on a non-mobile unit for use in a cannery, packing house, or the like.

The harvester 22 as diagrammatically illustrated in FIGS. 1 and 2 comprises a chassis 24 mounted on two drive wheels 26 and two steerable wheels 28. The drive wheels and other driven components of the harvester are driven by hydraulic motors 29 (only several of the motors being shown in FIG. 2) which receive power from an engine 30 mounted on the chassis. The harvester is controlled by an operator seated at an operator's station 32 which includes a plurality of engine and hydraulic controls (not shown) and a steering wheel 33 for steering the front wheels 28 of the harvester. The harvester 22 is driven into a field to be harvested at which time a driven pickup drum 34 having rows of spaced pickup fingers 36 thereon is rotated causing the bean pods P and clusters C to be stripped from the field. The drum 34 is secured to a shaft 38 journaled on arms 40 pivoted to the chassis 24 at 42 and is driven in a clockwise direction by a hydraulic motor 44 (FIG. 1) connected to the shaft 38 by a chain drive 46. The pickup fingers 36 are maintained about two centimeters above the ground level by hydraulic cylinders 47 connected between the chassis 24 and the arms 44, and controlled by skids 48 which ride along the ground. The fingers 36 strip the bean pods from the ground, throw the pods singly or in clusters along with a portion of the vines, leaves, and other debris in the direction indicated by the arrows in FIG. 1 onto a driven upwardly inclined conveyor 50 having spaced pod advancing flights or cross bars 52 on its outer surface.

The conveyor 50 advances the picked material over its upper end for gravitation through an air space 54 (FIG. 1) onto a driven second inclined conveyor 56. The second conveyor 56 advances the material upwardly over its upper end for gravitation through a second air space 58 onto a driven third inclined conveyor 60. In order to remove as much debris as possible from the clusters and single pods P, a main blower 62 is provided and directs air at high velocity through the air spaces 54 and 58 thus blowing the light debris upwardly and out of the harvester through a port at 64. The flow of debris to the discharge port 64 is guided by a curved housing 66.

The pre-cleaned clusters and single pods then gravitate onto the cluster breaker 20 of the present invention and, after the clusters have been broken into single pods, fall through an airspace 68 (FIGS. 1 and 3) onto a driven transverse conveyor 70. Cut stems or vines and other remaining debris are blown from the system as they fall through the air space 68 by a second blower 69.

The declustered and cleaned pods gravitate off the transverse conveyor 70 onto a narrow cross-bar elevator 72 which moves the produce upwardly onto a short transverse conveyor 73 for discharge into a storage hopper or bin 74.

In general, the cluster breaker 20 (FIGS. 2–9) comprises an upper series of spaced horizontal cluster conveyor runs 75 supported by guides 76 (FIGS. 11 and 12) in an upper generally horizontal plane, and a lower series of cluster conveyor runs 77 supported by guides 76' in a lower generally horizontal plane. Equal numbers of runs in each series or level move in opposite direction for more effectively spreading the clusters. The series of "conveyor runs," which term is to be construed broadly eough to also cover the guides 76 or 76', receive clusters of bean pods P and advance the clusters to the downstream ends of the associated runs. Pairs of upper rotary cutters 79 are positioned to straddle each downstream end of the several conveyor runs 75 at the upper level thereby severing the clusters and allowing them to gravitate downwardly. Similarly, pairs of lower rotary cutters 80 are positioned to straddle the downstream ends of the lower runs 77 to sever clusters conveyed to the cutters 80 by the associated lower runs 77. The lower runs are longer than the upper runs and the lower cutters are spaced further apart than are the upper cutters measured longitudinally of the runs so that large clusters may first be severed by the upper cutters and smaller clusters severed therefrom may fall onto the lower conveyor runs and again be severed in response to the lower conveyors moving the smaller clusters into the associated lower cutters 80.

More particularly, the cluster breaker 20 (FIGS. 3–12) of the present invention is disposed below the upper end of the third conveyor 60 and above the air space 68 in a substantially horizontal position extending substantially across the full width of the harvester. The cluster breaker comprises a horizontal frame 81 rigidly secured to the harvester chassis 24 as indicated in FIG. 3. A plurality of substantially vertical shafts 82 and 84 (FIGS. 4, 7 and 8) are mounted for rotation on the frame in spaced longitudinally extending rows of opposite ends of the cluster breaker adjacent the right and left sides of the harvester. The shafts 82 and 84 each have upper small diameter sprockets 86 keyed thereto, which sprockets lie in an upper common plane. Each transversely aligned pair of sprockets 86 are connected by an endless cluster chain conveyor 88 which chains define the previously mentioned upper runs 75 which have spaced cluster advancing pins 90 projecting upwardly therefrom. A plurality of the previously mentioned upper guide rails 76, one rail 76 (FIG. 12) being provided for each run 75 of the upper cluster conveyor 88, are bolted to the frame 81 and include a support beam 91 and sheet metal walls 92 which cooperate to support the conveyor run 75, guide the pins 90, and provide a minimal clearance between the walls and pair of associated cutters 79.

A plurality of large diameter sprockets 94 are keyed to the lower ends of shafts 84, and a pair of small diameter sprockets 96 (FIGS. 4–6) are keyed on idler shafts 98. All of the sprockets 94 and 96 lie in the same horizontal plane below the plane of the upper conveyors 88. A single endless lower cluster conveyor chain 100, which defines the previously mentioned lower runs, has spaced cluster advancing pins 102 projecting upwardly therefrom and is trained around sprockets 94 and 96 for movement along the zig-zag path. The lower guide rails 76' are disposed parallel to but not in vertical alignment with the upper rails 76 as best shown in FIG. 8. One lower rail 76' is provided for each lower run 77 of the lower conveyor, and each rail is rigidly secured to the frame 81.

In order to drive the cluster conveyors 88 and 100, a hydraulic motor 110 (FIGS. 4 and 7) is mounted on the frame and has its output shaft 112 connected to a shaft 82' by a chain drive 116. The shaft 82' is similar to but longer than the shafts 82 and also has one of the upper sprockets 86 keyed thereto. Accordingly, the shaft 82' drives one of the upper cluster conveyor chains 88 which in turn drives one of the shafts 84 having a large diameter sprocket 94 thereon which sprocket drives the single endless lower cluster conveyor 100. The lower cluster conveyor 100 then drives all of the remaining upper cluster conveyors 88 since at least one of the small diameter sprockets 86 of the remaining upper conveyor 88 and one of the large diameter sprockets of the lower conveyors are connected to common shafts 84.

The upper pairs of knives 79 at the right side of the harvester 22 are keyed to a shaft 120 (FIGS. 4,5 6 and 9) journaled on the frame 81 while the lower knives 80 at the right side of the harvester are keyed to a shaft 122 also journaled in the frame. Similarly, the upper knives 79 and the lower knives 80 on the left side of the harvester are keyed on shafts 124 and 126, respectively, journaled in the frame. The knives are all driven by a hydraulic motor 128 (FIG. 4) which is secured to the frame 81 and has its output shaft 130 coupled to a drive shaft 132 journaled on the frame 81. The drive shaft 132 and the lower cutter shaft 122 are drivingly connected by gears 134, and the upper knife shaft 120 and the shaft 122 are drivingly connected by a chain drive 136.

An elongated chain drive 137 interconnects the lower cutter shafts 126 and drive shaft 132 thus driving the lower left hand cutter shaft 126. A chain drive 140 (FIGS. 4 and 5) is connected between the upper left hand cutter shaft 124 and the lower cutter shaft 126 to drive the shaft 124.

During operation of the cluster breaker 20, clusters C of bean pods P, peas or similar articles along with single pods and vines are deposited onto the cluster breaker 20 (FIG. 3) with the single pods P falling through the cluster breaker 20 while the clusters fall onto the upper guides 76 and lower guides 76' and straddle the upper run 75 or lower runs 77 of the cluster conveyors 88 and 100. The pins 90 and 102 on the conveyor runs 75 and 77 then advance the clusters C into the associated downstream upper or lower cutters 79 and 80 which sever the vines to completely or partially break the cluster. Partial clusters C' (FIG. 12) broken by one of the upper cutters may then fall onto one of the lower runs 77 and are again cut to provide single pods P which are then collected by the conveyor 70.

Although only two levels of cluster conveyors and cutters have been illustrated, it will be understood that additional levels may be provided if desired. It will also be understood that although the cluster breaker has been described in its preferred embodiment as a component of a bean harvesting machine, the scope of the invention is broad enough to cover any type of articles that are connected together in clusters by severable members. It will also be understood that the cluster breaker need not be harvester mounted but may be mounted in a factory or processing plant. Also, the scope of the term "conveyor runs" as used in the specification and claims is to be construed broadly enough to include the conveyor run guides.

From the foregoing description it is apparent that the cluster breaker of the present invention includes a plurality of levels of spaced generally horizontal conveyor runs which receive clusters of articles and move the severable connecting members which hold the articles in clusters into cutters which sever the same. Partial clusters falling from upper levels may again straddle lower conveyor runs for movement into lower cutters which break the partial clusters into individual easily handled articles.

Although the best mode contemplated for carrying out the present invention has been herein shown and described, it will be apparent that modification and variation may be made without departing from what is regarded to be the subject matter of the invention.

What we claim is:

1. A cluster breaker for separating a plurality of articles interconnected by severable connectors comprising: continuously driven endless conveyor means having a plurality of spaced parallel conveyor runs lying in a common substantially horizontal plane with certain of said runs moving in a first direction and substantially the same number of runs moving in the opposite direction each of said runs having a downstream end, means for depositing clusters of articles onto said conveyor runs with the severable connectors straddling the runs and the articles hanging downwardly therefrom, and driven cutter means at the downstream end of each run positioned to sever the severable connectors which support the clusters on their associated runs.

2. An apparatus according to claim 1 wherein said conveyor runs each including a movable portion and a stationary guide portion, and wherein a plurality of the movable portions move in said first direction and substantially the same number of movable portions move in the opposite direction.

3. An apparatus according to claim 1 wherein said driven cutter means are rotary cutters having sharpened circular peripheries.

4. An apparatus according to claim 1 wherein said driven cutter means are pairs of rotary cutters with each pair of cutters straddling the associated conveyor run at its downstream end.

5. An apparatus according to claim 1 wherein a plurality of spaced pins are secured on each conveyor run and project upwardly to engage said severable connectors for positively driving said connectors through said cutter means.

6. A cluster breaker for separating a plurality of articles interconnected by severable connectors comprising; a plurality of driven spaced parallel upper conveyor runs of one or more upper endless conveyors lying in a common substantially horizontal upper plane with certain of said runs moving in a first direction and substantially the same number of runs moving in the opposite direction, each of said runs having a downstream end, a plurality of driven spaced parallel lower conveyor runs of one or more lower endless conveyors disposed below said upper conveyor runs and lying in a common substantially horizontal lower plane with certain of said runs moving in a first direction and substantially the same number of runs moving in the opposite direction, each of said lower runs having a downstream end, said lower conveyor runs being disposed in vertical planes passing between adjacent ones of said upper runs, means for depositing clusters of articles onto said conveyor runs with the severable connectors straddling the runs and the articles hanging downwardly therefrom, and driven cutter means at the downstream end of each run positioned to sever the severable connectors which support the clusters on their associated runs thereby releasing the clusters from said associated runs.

7. An apparatus according to claim 6 wherein the cutters associated with the downstream ends of adjacent ones of said lower runs are spaced a greater distance apart measured longitudinally of said runs than are the cutters associated with the downstream ends of adjacent ones of said upper runs thereby allowing partial clusters severed by the upper cutter means to fall downwardly and straddle the lower conveyor run for thereafter being severed by the cutter means associated with said straddled run.

8. An apparatus according to claim 6 wherein said driven cutter having sharpened circular peripheries means are pairs of rotary cutters with each pair of cutters straddling the associated conveyor run at its downstream end.

9. An apparatus according to claim 6 wherein a plurality of spaced pins are secured on each conveyor run and project upwardly to engage said severable connectors for positively driving said connectors through said cutter means.

10. An apparatus according to claim 6 wherein said upper conveyor runs are runs of a plurality of continuously driven endless conveyors which lie in a common upper plane, and wherein said lower conveyor runs are runs of a single continuously driven endless conveyor which lie in a common lower plane.

11. An apparatus according to claim 6 wherein stationary guide means are provided for each run for supporting said run for movement along a linear path.

* * * * *